United States Patent
Hanada

(10) Patent No.: US 9,712,692 B2
(45) Date of Patent: Jul. 18, 2017

(54) COMMUNICATION APPARATUS, COMMUNICATION METHOD, AND COMMUNICATION SYSTEM FOR SELECTING WHETHER OR NOT TO SEND ACKNOWLEDGEMENT RESPONSE IN RESPONSE TO REQUEST FOR ACKNOWLEDGEMENT RESPONSE

(71) Applicant: SEIKO EPSON CORPORATION, Tokyo (JP)

(72) Inventor: Takashi Hanada, Tochigi (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 15/007,681

(22) Filed: Jan. 27, 2016

(65) Prior Publication Data

US 2016/0227051 A1    Aug. 4, 2016

(30) Foreign Application Priority Data

Feb. 2, 2015   (JP) .................. 2015-018190

(51) Int. Cl.
| | |
|---|---|
| H04N 1/00 | (2006.01) |
| H04L 12/58 | (2006.01) |
| H04L 1/00 | (2006.01) |
| H04L 1/16 | (2006.01) |

(52) U.S. Cl.
CPC .......... *H04N 1/00212* (2013.01); *H04L 1/00* (2013.01); *H04L 1/1685* (2013.01); *H04L 51/16* (2013.01); *H04L 51/22* (2013.01); *H04N 1/00217* (2013.01); *H04N 2201/0094* (2013.01)

(58) Field of Classification Search
USPC .......... 358/1.6, 1.9, 1.15, 403, 405, 426.02, 358/426.12
See application file for complete search history.

(56) References Cited

U.S. PATENT DOCUMENTS

| | | | |
|---|---|---|---|
| 2003/0163574 A1 | 8/2003 | Tohki et al. | |
| 2008/0263670 A1* | 10/2008 | Stavrica | H04L 12/58 726/24 |
| 2009/0150493 A1* | 6/2009 | Tonegawa | H04L 12/5875 709/206 |
| 2011/0238764 A1* | 9/2011 | Shibata | H04L 12/5855 709/206 |

FOREIGN PATENT DOCUMENTS

JP        2003-258933 A      9/2003

* cited by examiner

*Primary Examiner* — Marcellus Augustin
(74) *Attorney, Agent, or Firm* — Global IP Counselors, LLP

(57) ABSTRACT

Provided is a communication apparatus in which when reception data from a transmission apparatus contains a request for an acknowledgement response, a determination as to whether or not to send an acknowledgement response from the communication apparatus to the transmission apparatus is made, if the acknowledgement response is permitted, an acknowledgement is sent to the transmission apparatus over a network, and when the acknowledgement response is not permitted, reception data containing the acknowledgement response is transferred to the external apparatus.

8 Claims, 12 Drawing Sheets

| DESTINATION | DESTINATION NAME | DATE AND TIME OF CREATION |
|---|---|---|
| tanaka@BBB.co.jp | TANAKA TARO | 01/02/2015 |
| satou@BBB.co.jp | SATOU ICHIRO | 12/13/2014 |
| umineko@CCC.co.jp | UMINEKO TRADING COMPANY | 11/01/2014 |
| tarou@DDD.co.jp | NAGOYA TARO | 10/20/2014 |
| ⋮ | ⋮ | ⋮ |

| GROUP | TRANSMISSION TYPE | DESTINATION | DESTINATION NAME | TRANSMISSION ATTRIBUTE |
|---|---|---|---|---|
| 1 | Internet FAX | tanaka@BBB.co.jp | TANAKA TARO | MAIL-TYPE |
| 2 | Internet FAX | satou@BBB.co.jp | SATOU ICHIRO | MAIL-TYPE |
| 3 | Internet FAX | nagoya@192.166.12.11 | NAGOYA BRANCH | DIRECT SMTP |
| 5 | Internet FAX | osaka@192.144.13.24 | OSAKA BRANCH | DIRECT SMTP |
| 1 | Internet FAX | nagano@188.164.13.14 | NAGANO HEAD OFFICE | DIRECT SMTP |
| 4 | Internet FAX | nagoya@192.166.13.2 | SASAKI TARO | DIRECT SMTP |
| 3 | Internet FAX | nagoya@192.166.13.2 | YAMADA HANAKO | DIRECT SMTP |
| ⋮ | ⋮ | ⋮ | ⋮ | ⋮ |

| DESTINATION | DESTINATION NAME | DATE AND TIME OF CREATION |
|---|---|---|
| tanaka@BBB.co.jp | TANAKA TARO | 01/02/2015 |
| satou@BBB.co.jp | SATOU ICHIRO | 12/13/2014 |
| umineko@CCC.co.jp | UMINEKO TRADING COMPANY | 11/01/2014 |
| ⋮ | ⋮ | ⋮ |

510 → (HEADER PART)
Date: Mon, 19 Feb 2014 04:17:19 +0900
From: "Taro Yamada"< taro@bbb.co.jp > ~ 511
To: hanako@ccc.co.jp ~ 512
•
•
•
Disposition-Notification-TO: taro@bbb.co.jp ~ 513
MIME-Version: 1.0
Content-Type: multipart/mixed; boundary="boundary_str"
Content-Transfer-Encoding: 7bit 520 → (BODY PART/MAIN TEXT)
--boundary_str
Content-Type: text/plain; charset="ISO-2022-JP"
Content-Transfer-Encoding: 7bit
•
•
530 → •
(BODY PART/ATTACHMENTS)
--boundary_str
Content-Type: image/Tiff;
name="ESTIMATION"
•
•
•
Content-Transfer-Encoding: base64

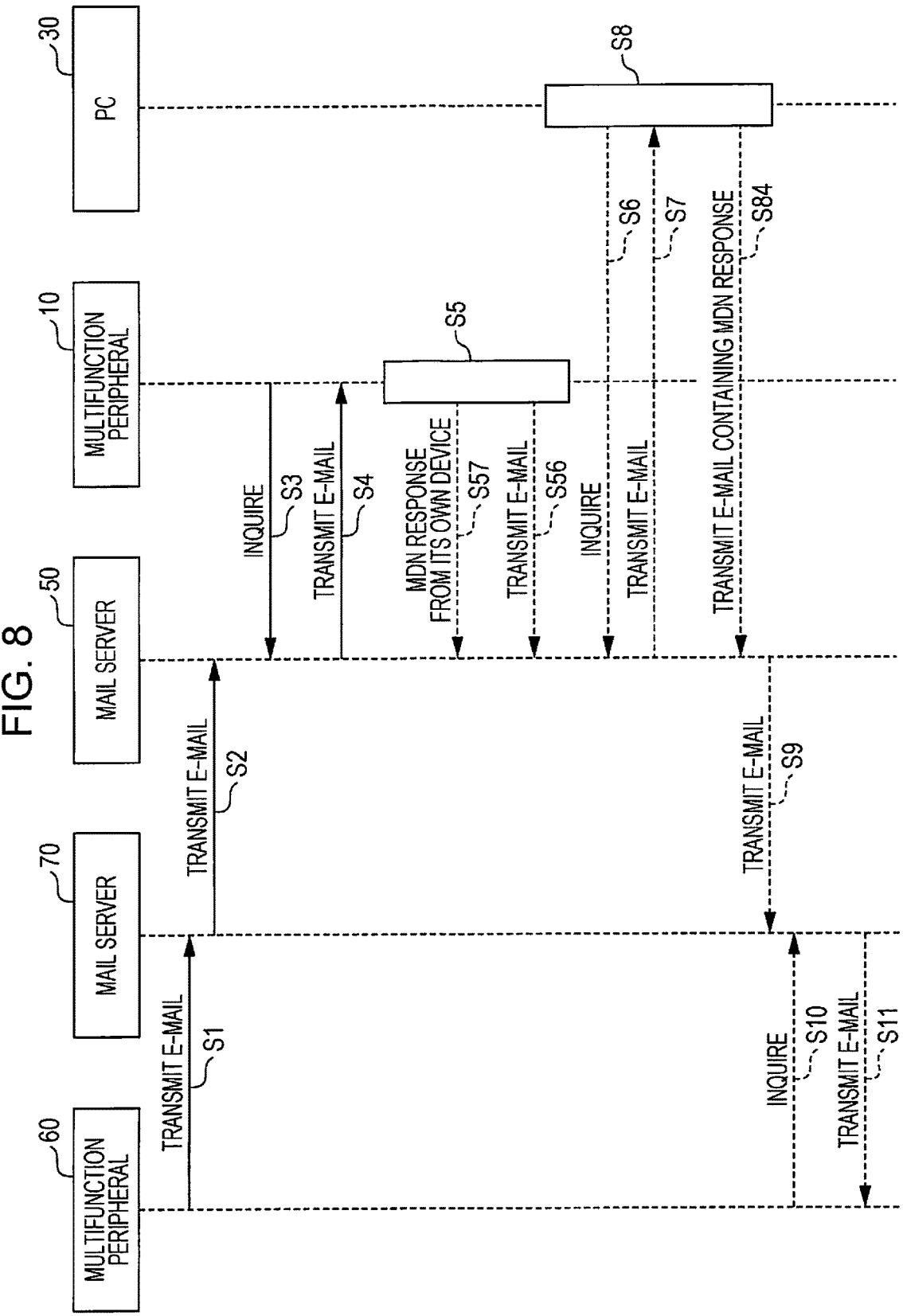

COMMUNICATION APPARATUS, COMMUNICATION METHOD, AND COMMUNICATION SYSTEM FOR SELECTING WHETHER OR NOT TO SEND ACKNOWLEDGEMENT RESPONSE IN RESPONSE TO REQUEST FOR ACKNOWLEDGEMENT RESPONSE

BACKGROUND

1. Technical Field

The present invention relates to a communication apparatus that communicates data over a network, among communication apparatuses that communicate data.

2. Related Art

An Internet facsimile that transmits a fax image to a transmission destination apparatus by attaching the fax image to an e-mail has been standardized by the International Telecommunication Union Telecommunication Standardization Sector (ITU-T). In the Internet facsimile, since the fax image is attached to the e-mail, it is possible to transmit the fax image to a transmission destination apparatus over a network. Examples of a transmission method of an e-mail in the Internet facsimile include a mode (a simple mode, or a full mode) of transmitting an e-mail to a counterpart apparatus through a mail server, and a mode (direct SMPT) of directly transmitting an e-mail to a transmission destination apparatus without passing through a mail server.

In the full mode of the Internet facsimile, a request for an acknowledgement response may be given to an e-mail for confirming whether or not the e-mail is successfully delivered to a transmission destination apparatus. An apparatus that has received the e-mail having the request for an acknowledgement response notifies that the delivery of the e-mail has been completed, by performing a process (acknowledgement response) of returning the e-mail to a destination that is designated by the request for an acknowledgement response (for example, see JP-A-2003-258933).

If an apparatus responds to all requests for acknowledgement responses, acknowledgement responses are transmitted even to transmission source apparatuses that the user does not intend. For example, the acknowledgment responses are made for e-mails that are indiscriminately delivered from the transmission source apparatus, resulting in that the destination of the transmission destination apparatus is known to the user of the transmission source apparatus.

SUMMARY

An advantage of some aspects of the invention is to provide a communication apparatus in which a user is able to select whether to send an acknowledgement response for a request for an acknowledgement response.

According to an aspect of the invention, there is provide a communication apparatus including a first communication unit that communicates with a transmission source apparatus over a network; a second communication unit that communicates with an external apparatus; a storage unit that stores destination information of the transmission source apparatus; a determination unit that determines whether or not to send an acknowledgement response from the communication apparatus to the transmission source apparatus, based on the destination information, when reception data contains a request for the acknowledgement response; and a response control unit, in which when the acknowledgement response is permitted, the response control unit sends an acknowledgement to the transmission source apparatus by using the first communication unit, and when the acknowledgement response is not permitted, the response control unit transfers the reception data to the external apparatus by using the second communication unit.

"Network" means a generic term of a circuit network such as the Internet or a local area network (LAN), through which a communication apparatus transmits an e-mail with the Internet facsimile.

"Destination information" is a concept including a destination book in which the destination of the transmission destination apparatus is registered, history information having past transmission results recorded therein, and a list indicating permission or non-permission of acknowledgement responses.

According to the aspect of the invention, when the reception data contains a request for an acknowledgement response, the determination unit determines whether or not to send an acknowledgement response from the communication apparatus to the transmission source apparatus, based on the destination information. Then, when the acknowledgement response is permitted by the determination unit, the response control unit sends an acknowledgement from the communication apparatus to the transmission source apparatus using the first communication unit. Meanwhile, when the acknowledgement response is not permitted by the determination unit, the response control unit transfers reception data to an external apparatus by using the second communication unit. Therefore, because such reception data undergoes by the user of the external apparatus, the user can select whether or not to perform acknowledgement response for the request for an acknowledgement response.

BRIEF DESCRIPTION OF THE DRAWINGS

The invention will be described with reference to the accompanying drawings, wherein like numbers reference like elements.

FIG. 3 is a diagram illustrating an MDN automatic response table stored in a control memory.

FIG. 4 is a diagram illustrating a destination book stored in the control memory.

FIG. 7 is a diagram illustrating the format of an e-mail used in an Internet FAX.

FIG. 8 is a timing chart illustrating an overview of the Internet FAX.

DESCRIPTION OF EXEMPLARY EMBODIMENTS

Hereinafter, embodiments of the present invention will be described in the following order.
1. First embodiment:
(1) Configuration of communication system
(2) Configuration of e-mail (reception data)
(3) MDN response (acknowledgement response) method
(4) Operation and Effect of the invention
2. Second embodiment:
3. Other embodiments:

1. First Embodiment (1) Configuration of Communication System

An example of a communication apparatus will be described, based on a multifunction peripheral with a fax function, a printing function, and an image reading function. The fax function provided in the multifunction peripheral has a function (Internet facsimile, hereinafter also referred to as the Internet FAX) of transmitting an e-mail by attaching a fax image to the e-mail over a network, and a function of transmitting a fax image through a telephone line. The multifunction peripheral can use a transmission method of a full mode and a simple mode (hereinafter, referred to as a mail method) passing through a mail server, and a transmission method of a direct SMTP without passing through the mail server, in the Internet FAX.

Figure 1:
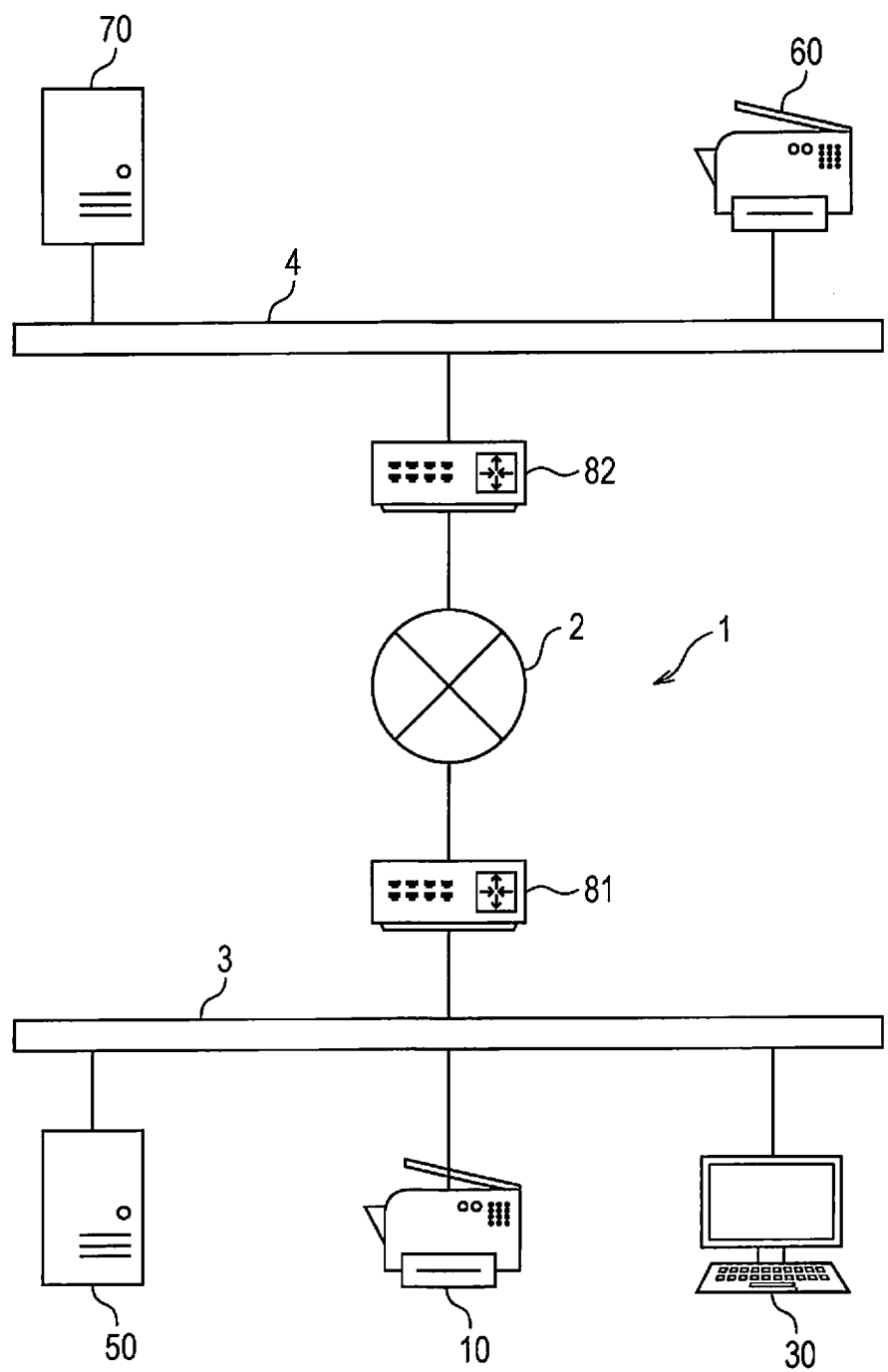
FIG. 1 is a diagram illustrating respective apparatuses that are connected over a network.

FIG. 1 is a diagram illustrating respective apparatuses that are connected over a network. In the configuration illustrated in FIG. 1, multifunction peripherals 10 and 60 with a function of transmitting and receiving e-mails can perform the Internet FAX over a network 1. The network 1 includes a large-scale network system 2 such as the Internet, and LANs 3 and 4 which are connected to the large-scale network 2 through routers 81 and 82. The routers 81 and 82 correspond to, for example, a dynamic domain name system (DDNS), and can also perform specification of IP addresses for the dynamically allocated IP addresses.

A personal computer 30 and a mail server 50 are connected to the LAN 3 to which the multifunction peripheral 10 is connected. The personal computer (hereinafter, also referred to as a PC) 30 can perform the operation of the multifunction peripheral 10, and creates an e-mail, in response to the user operation. The mail server 50 processes e-mails destined for the multifunction peripheral 10 and the PC 30, or e-mails transmitted from the multifunction peripheral 10 and the PC 30, based on a simple mail transfer protocol (SMTP) or a post office protocol (POP).

In the present embodiment, the multifunction peripheral 10 and the PC 30 which is an external apparatus correspond to a communication system of the invention.

A mail server 70 is connected to the LAN 4 to which the multifunction peripheral 60 is connected. The mail server 70 processes e-mails destined for the multifunction peripheral 60 or e-mails transmitted from the multifunction peripheral 10, based on the known SMTP or the known POP.

In addition, it is constructed that the mail server 50 and multifunction peripheral 10 are connected to the same LAN and the mail server 70 and the multifunction peripheral 60 are connected to the same LAN, but the mail servers 50 and 70 may be connected to LANs different from the multifunction peripherals 10 and 60. In addition, it is assumed that the mail servers 50 and 70 have any one of functions of an SMTP server that receives e-mails, and a POP server that transfers e-mails that have been transmitted, destined for a multifunction peripheral or a PC, in accordance with a request from a multifunction peripheral or a PC. In addition, the mail servers 50 and 70 may be constructed by separate servers respectively for the SMTP server and the POP server.

Figure 2:
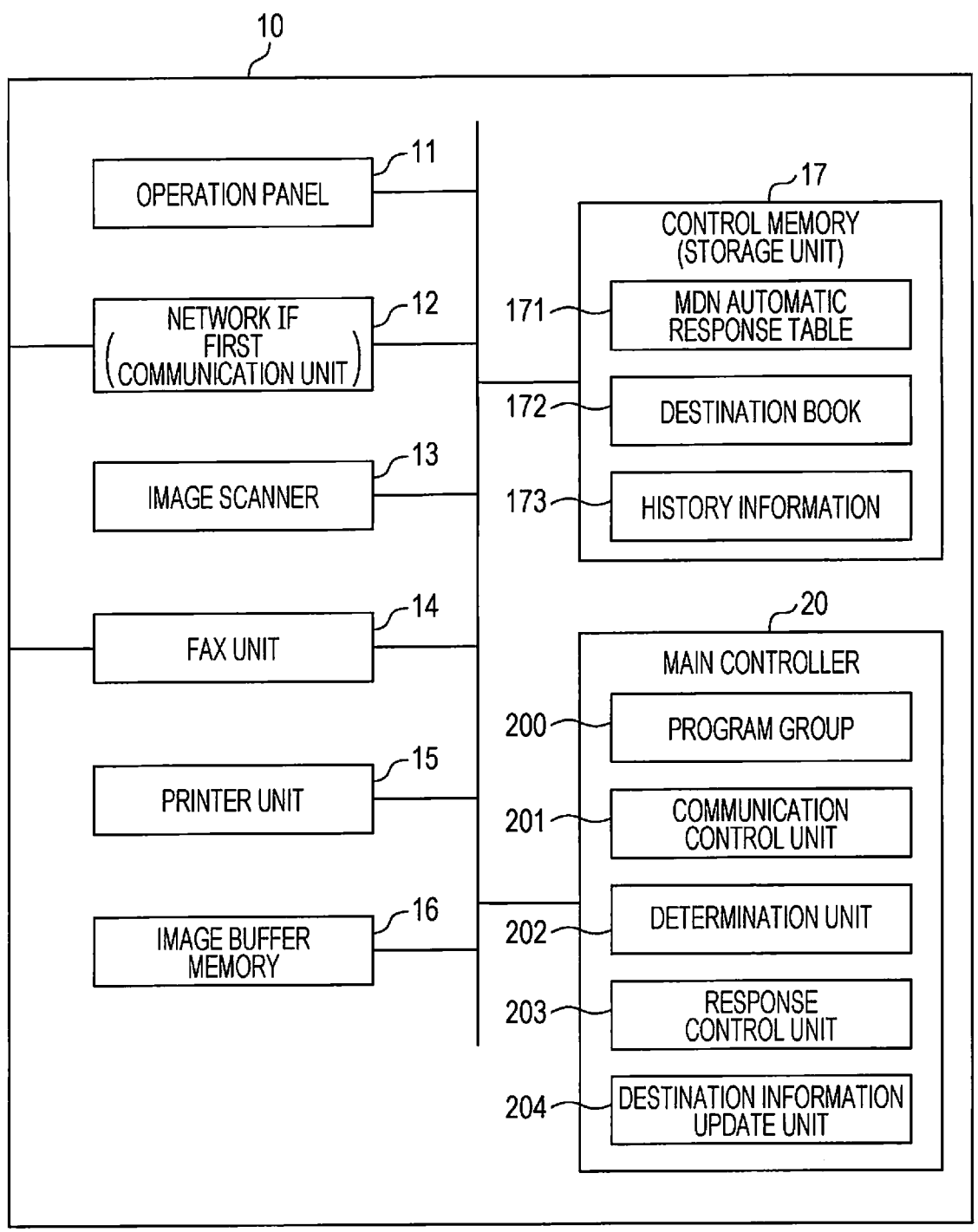
FIG. 2 is a block diagram illustrating the configuration of a multifunction peripheral.

FIG. 2 is a block diagram illustrating the configuration of the multifunction peripheral 10. In addition, since the configuration of the multifunction peripheral 60 is similar to the configuration of the multifunction peripheral 10, a description thereof will be omitted. The multifunction peripheral 10 includes an operation panel 11, a network IF 12, an image scanner 13, a fax unit 14, a printer unit 15, an image buffer memory 16, a control memory 17, and a main control unit 20.

The operation panel 11 includes operation keys for receiving user operations, and a display unit that displays a predetermined character or image. The display unit may function as a touch panel that receives user operations.

The network IF 12 has a function of connecting the multifunction peripheral 10 to the LAN 3. The network IF 12 is realized by, for example, a known network interface card (NIC), a network card, and a LAN card. The network IF 12 functions as a first communication unit of the invention, by connecting the multifunction peripheral 10 to the LAN 3. Since the network IF 12 communicates with the PC 30 through the LAN 3, the second communication unit is realized by the network IF 12.

The image scanner 13 is provided with a platen for setting a document and a unit that generates a document image by reading the set document. The document image read by the image scanner 13 is stored in the image buffer memory 16.

The fax unit 14 is equipped with a controller that converts the image, and a modem. The fax unit 14 converts the document image read by the image scanner 13 into an image of a different type by the controller and generates a fax image. When transmitting the fax image through an e-mail (that is, the Internet FAX), the controller converts the document image into, for example, a file of a tagged image file format (TIFF) format. Meanwhile, when transmitting the fax image through a telephone network (that is, normal facsimile communication), the fax image generated by the controller is analog-converted by the modem, and is output to the telephone network.

The printer unit 15 is, for example, an ink jet printer that ejects an ink as a colorant to the paper, or a laser printer that transfers a toner as a colorant to a photosensitive member.

The control memory 17 stores a MDN automatic response table 171, a destination book 172, and history information 173, which function as destination information. The MDN automatic response table 171, the destination book 172, and the history information 173 store the destination (mail address) of the transmission destination of the e-mail that is selected according to the conditions to be used. In this embodiment, the control memory 17 corresponds to a storage unit.

FIG. 3 is a diagram illustrating an MDN automatic response table stored in a control memory. The MDN automatic response table 171 is a database that records the destination Ad1 for making a response by force, when there is a request for an MDN response. The multifunction peripheral 10 receives an e-mail with the destination recorded in the MDN automatic response table 171 as a transmission source, and if a request for an MDN response is included in an e-mail, the multifunction peripheral 10 makes an MDN response by force. With respect to the destination recorded in the MDN automatic response table 171, the registration or deletion is managed by a user of the multifunction apparatus 10.

FIG. 4 is a diagram illustrating the destination book 172 stored in the control memory. The destination book 172 stores the destination (an e-mail address and an IP address) of a transmission destination apparatus, a group, the name of the transmission destination apparatus, and a transmission attribute in Hyper text markup language (HTML), when the multifunction peripheral 10 transmits an e-mail through the Internet fax. The main control unit 20 can display the contents of the destination book 172 on the operation panel 11 by reading the information registered in the destination book 172, or set the information as the destination of the transmission destination apparatus. It should be noted that the creation of the destination book 171 in HTML is only an example. With respect to the destination Ad2 recorded in the destination book 172, the registration or deletion is managed by the user of the multifunction peripheral 10.

Figures 5, 6:
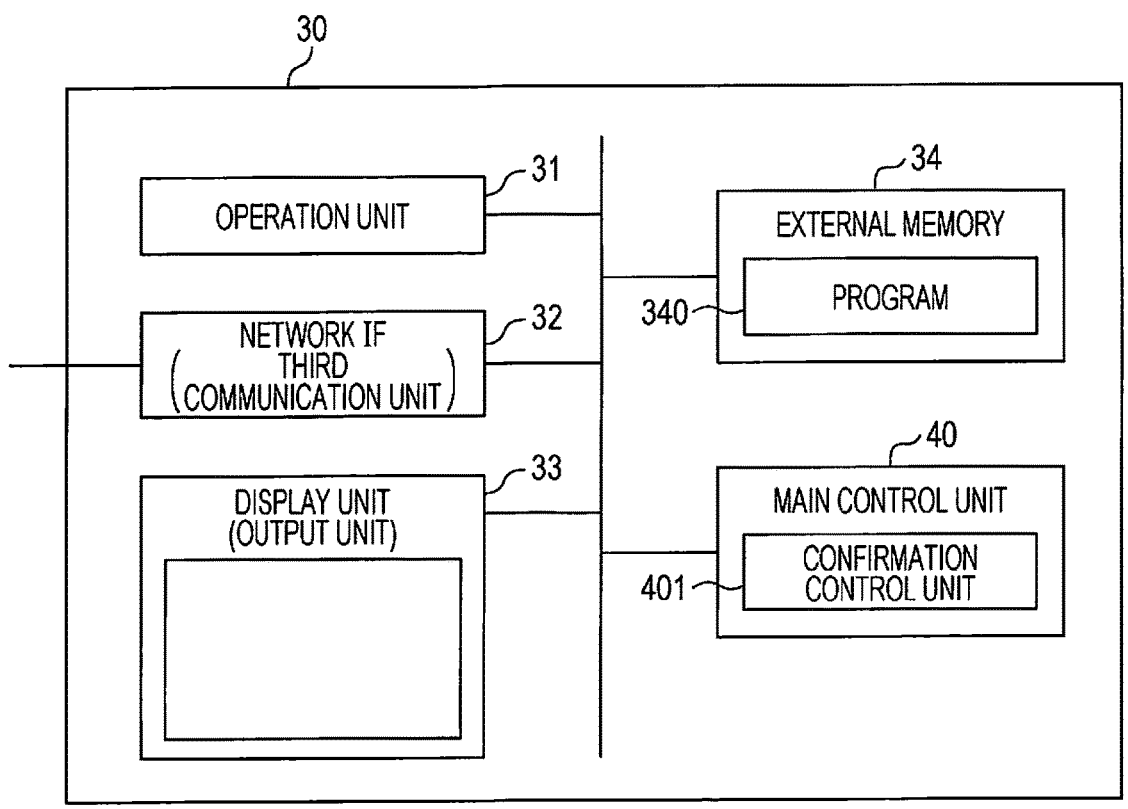
FIG. 5 is a diagram illustrating history information stored in the control memory.
FIG. 6 is a block diagram illustrating the configuration of a PC.

FIG. 5 is a diagram illustrating the history information stored in the control memory. The history information 173 is a database that records the destination for which the transmission of an e-mail has been successful, among the histories of transmissions of an e-mail by the multifunction peripheral 10. "The transmission of an e-mail has been successful" means that a connection is established between the multifunction peripheral 10 and the transmission destination apparatus, and an e-mail reaches the mail server in which the transmission destination apparatus has been registered. Each time the e-mail is transmitted, the multifunction peripheral 10 (destination information update unit described later) may update the history information. In FIG. 5, some duplicate destinations with the MDN automatic response table are registered. For example, the multifunction peripheral 10 may determine the destinations registered in the history information 173 as the destinations registered in the MDN automatic response table.

The main control unit 20 functions as a computer provided with a CPU, a ROM, and a RAM, which are not illustrated, and integrally controls the operations of the multifunction peripheral 10. The ROM stores a program group 200 for causing the CPU to implement predetermined functions. The program group 200 stores programs for causing the CPU to implement a function of an operating system (OS) for integrating the operations of the multifunction peripheral 10, a function as a mailer for creating and displaying an e-mail, a function of communicating with the mail server and transmitting an e-mail on the Internet fax.

The main control unit 20 includes respective functions of a communication control unit 201, a determination unit 202, a response control unit 203, and a destination information updating unit 204, by the CPU of the main control unit 20 executing the program group 200 stored in the ROM.

The communication control unit 201 performs creation of an e-mail, and transmission to the mail server 50 of the created e-mail, is in connection with the Internet FAX. The communication control unit 201 creates an e-mail according to the protocol conforming to multipurpose Internet mail extensions (MIME). In the MIME, it is possible to attach various data (in the present embodiment, a fax image) to the e-mail. The format of the e-mail created by the communication control unit 201 will be described in detail later.

When a request for an MDN response is contained in the received e-mail, the determination unit 202 determines whether or not to perform a MDN response to a transmission source apparatus from the multifunction peripheral 10, based on the destination information. Moreover, when the MDN response is permitted by the determination unit 202, the response control unit 203 performs an MDN response to the transmission source apparatus, and if an MDN response is not permitted, the response control unit 203 transfers an e-mail to the PC 30.

FIG. 6 is a block diagram illustrating the configuration of the PC 30. The PC 30 includes an operation unit 31, a network IF 32, a display unit 33, an external memory 34, and a main control unit 40.

The operation unit 31 is configured with a keyboard and a mouse, and receives an operation input of the user. The display unit 33 is provided with a known display panel such as a liquid crystal display (LCD), and is able to display the image generated by the main control unit 40 or an image acquired from outside. When the display unit 33 has a function as a touch panel, there is a case where the display unit 33 functions as an operation unit.

The network IF 32 connects the PC 30 to the LAN3. In this embodiment, the network IF 32 connects the PC 30 to the LAN3 so as to realize a third communication unit. Incidentally, since it is possible to apply the same configuration as that of the network IF 12 provided in the multifunction peripheral 10 to the network IF 32, description thereof will be omitted.

The external memory 34 is configured with a known hard disk drive or a known non-volatile memory such as a solid state drive (SSD). The external memory 34 stores a program group 340 for performing processes necessary for performing a function as an OS and an MDN response to be described later, for the main control unit 40.

The main control unit 40 is equipped with a CPU, a ROM, and a RAM, which are not illustrated, and integrally controls the operation of the PC 30. The main control unit 40 controls the reception of the operation input using the operation unit 31, and the connection to the LAN 3 with the network IF 32, by executing the program group 340 stored in the external memory 34.

Further, the main control unit 40 realizes the functions of the confirmation control unit 401 by executing a program 340 stored in the external memory 34. When an e-mail is transferred from the multifunction peripheral 10, the confirmation control unit 401 causes the display unit 33 to display the e-mail (reception data), and causes the user to confirm the e-mail. In addition, when the confirmation of the e-mail by the user is positive, the confirmation control unit 401 creates an e-mail with a MDN response, and transmits the e-mail to the transmission source apparatus.

(2) Configuration of E-Mail (Reception Data)

Next, the format of an e-mail used in an Internet FAX will be described. FIG. 7 is a diagram illustrating the format of an e-mail used in an Internet FAX. Incidentally, FIG. 7 mainly illustrates fields (character string) related to the invention, and the illustration of other fields is omitted.

The format of the e-mail 500 includes a header part 510, and a body part including a text or a fax image which is displayed by the mailer software. In addition, the body part includes a body part/text 520 configured with only a string of a text format, and a body part/attachment 530 having a fax image attached thereto.

The header part 510 includes a transmission source field 511 indicating the destination of the transmission source apparatus, a transmission destination field 512 indicating the destination of the transmission source apparatus, or an MDN response request field 513 which is formed when requesting an MDN response. When an MDN response is requested in the e-mail 500, a string "Disposition-Notification" indicating a request for the MDN response and a destination address (in FIG. 7, taro@bbb.co.jp) of the MDN response are formed as the MDN response request field 513.

The body part/text 520 is attached when the user transmits data of a text format by the e-mail 500. The body part/text 520 starts with a string "boundary-", and a text to be transmitted is recorded therein.

The body part/attachment 530 is attached when the user transmits data of an image format by the e-mail 500. The body part/attachment 530 starts with a string "boundary-", and "Content-Type" indicating the type of the attachment, a name "name" given to the attachment, and a main body of the attachment are recorded therein. When a fax image is intended to be attached to the e-mail, "Content-Type" is set to "Tiff", and the fax image generated by the fax unit 14 is attached to the body part/attachment 530.

The MDN response for the MDN request is transmitted by attaching the result information of MDN to a header part in which the destination address of the MDN response recorded in the header part 510 is the transmission destination field. As the result information, ID for identifying an MDN request, and information on the transmission source apparatus are recorded.

(3) MDN Response Method

Next, an acknowledgement response method that is performed by the multifunction peripheral 10 will be described, based on an example in which an e-mail is delivered from the multifunction peripheral 60 to the multifunction peripheral 10. FIG. 8 is a timing chart illustrating an overview of the Internet FAX. Further, in FIG. 8, among the processes of the respective apparatuses, the processes to be selectively performed are denoted by dotted lines. In other words, the processes denoted by the dotted lines may be performed or may not be performed, depending on the conditions provided in the multifunction peripheral 10 and the PC 30.

In step S1, the multifunction peripheral 60 transmits an e-mail destined for the multifunction peripheral 10 to the mail server 70. It is assumed that the e-mail transmitted from the multifunction peripheral 60 includes a request for an MDN response.

In step S2, the mail server 70 transfers the e-mail transmitted from the multifunction peripheral 60 to the mail server 50 connected to the LAN 3. Therefore, the mail server 50 accumulates the e-mail destined for the multifunction peripheral 10.

In step S3, the multifunction peripheral 10 inquires of the mail server 50 about an e-mail destined for the multifunction peripheral 10, which are accumulated in the mail server 50. In step S4, the mail server 50 transmits the e-mail destined for the multifunction peripheral 10 to the multifunction peripheral 10, in response to the inquiry from the multifunction peripheral 10.

Figure 9:
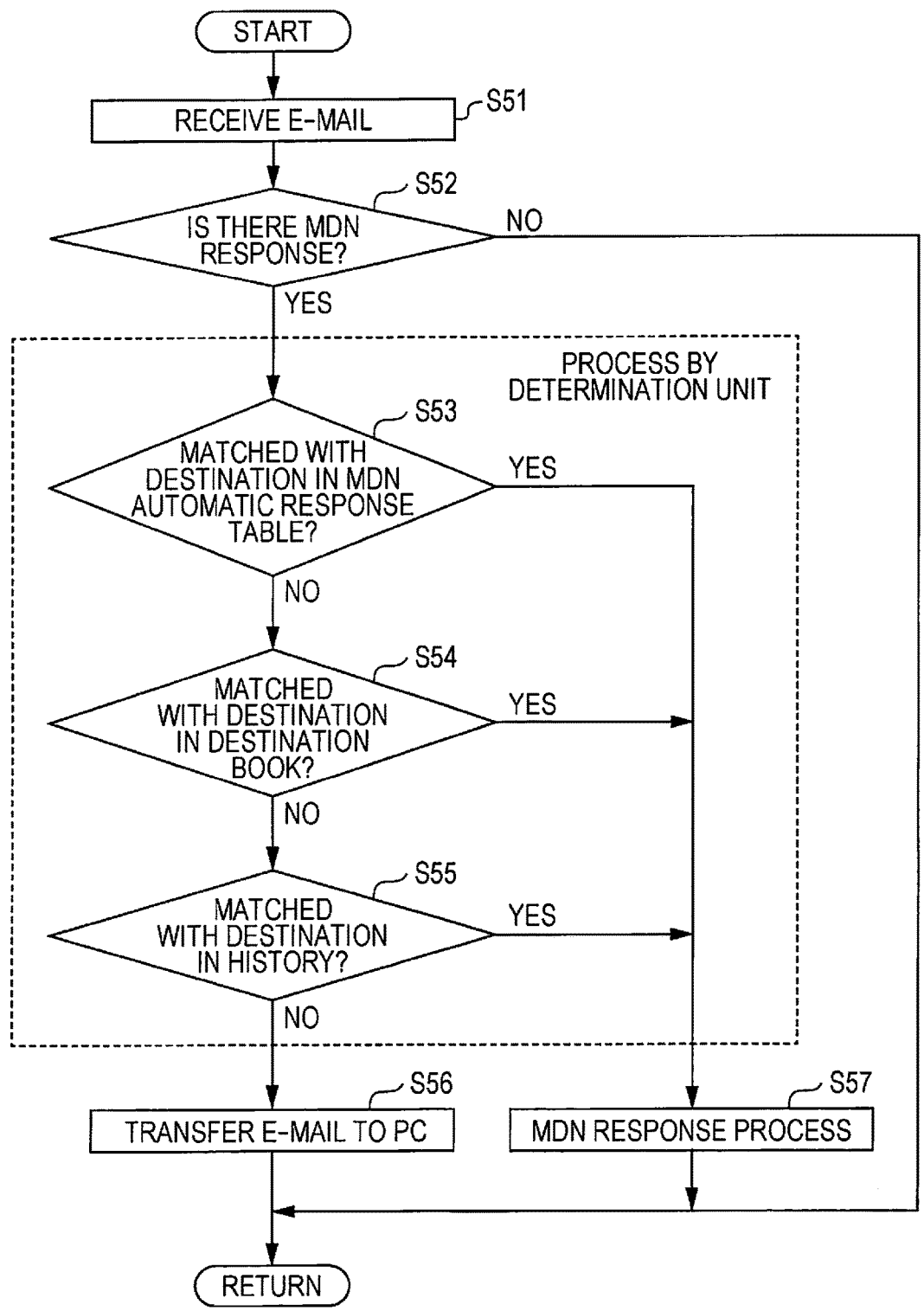
FIG. 9 is a flowchart illustrating a determination process and a response control process that are performed by the multifunction peripheral in step S5 of FIG. 8.

In step S5, when a request for an MDN response is contained in the transmitted e-mail, the multifunction peripheral 10 performs a determination process (a determination function, or a determination step) as to whether the multifunction peripheral 10 performs the MDN response, based on the destination information, and a response control process (response control function, response control step) of performing the MDN response by the multifunction peripheral 10, and transferring an e-mail to the PC 30, in response to the result of the determination process. FIG. 9 is a flowchart illustrating a determination process and a response control process that are performed by the multifunction peripheral 10 in step S5 of FIG. 8.

First, in step S51 of FIG. 9, the main control unit 20 receives an e-mail. Then, in step S52, the main control unit 20 searches the presence or absence of a request for an MDN response, with reference to the header part of the e-mail. Specifically, the main control unit 20 refers to whether or not the MDN response request field (FIG. 7) is included in the header part.

When the request for the MDN response is not included in the header part (step S52: NO), the main control unit 20 ends the process. When the request for the MDN response is included in the header part (step S52: YES), the main control unit 20 proceeds to step S53.

In step S53, the determination unit 202 compares the destination registered in the MDN automatic response table 171 with the destination of the transmission source apparatus included in the e-mail. The MDN automatic response table 171 has a recorded destination which is a target of a forced MDN response, and if the destination corresponds to the destination recorded in the MDN automatic response table 171, it is necessary to perform the MDN response by force.

If the destinations match each other (step S53: YES), the process proceeds to step S57, and the response control unit 203 performs the MDN response by the multifunction peripheral 10. In other words, the determination unit 202 performs the MDN response by the main control unit 20. Therefore, the response control unit 203 creates an e-mail which is destined for the address recorded in the MDN response request field and contains the MDN response. The response control unit 203 transmits the created e-mail (MDN response) through the network IF 12.

Meanwhile, if the destinations do not match each other (step S53: NO), the process proceeds to step S54, and the determination unit 202 compares the destination recorded in the destination book 172 with the destination of the transmission source apparatus. The reason why referring to the destination book 172 is that if the destination has been registered in the destination book 172, it is possible to obtain a tentative confidence in performing the MDN response through the action of registration by the user.

If the destinations match each other (step S54: YES), the process proceeds to step S57, and the response control unit 203 performs the MDN response by the main control unit 20. In other words, the determination unit 202 performs the MDN response by the main control unit 20.

If the destinations do not match each other (step S54: NO), the process proceeds to step S55, and the determination unit 202 compares the destination recorded in the history information 173 with the destination of the transmission source apparatus. The reason why referring to the history information 173 is that if the destination has been registered in the history information 173, the user has transmitted the e-mail even once, and it is possible to obtain a tentative confidence in performing the MDN response.

If the destinations match each other (step S55: YES), the process proceeds to step S57, and the response control unit 203 performs the MDN response by the main control unit 20. In other words, the determination unit 202 performs the MDN response by the main control unit 20.

If the destinations do not match each other (step S55: NO), the response control unit 203 transfers an e-mail to the PC 30 in step S56. Proceeding to step S56 corresponds to that the determination unit 202 does not permit the MDN response by the main control unit 20. The response control unit 203 transfers the e-mail destined for the multifunction peripheral 10 to the PC 30, and encourages the user to confirm the e-mail using the PC 30.

Therefore, in step S6 of FIG. 8, the PC 30 inquires the mail server 50 about an e-mail with the PC 30 as the destination. Then, if the PC 30 receives an e-mail destined for the PC 30 from the mail server 50 in step S7, the PC 30 performs a confirmation control process in step S8.

Figure 10:
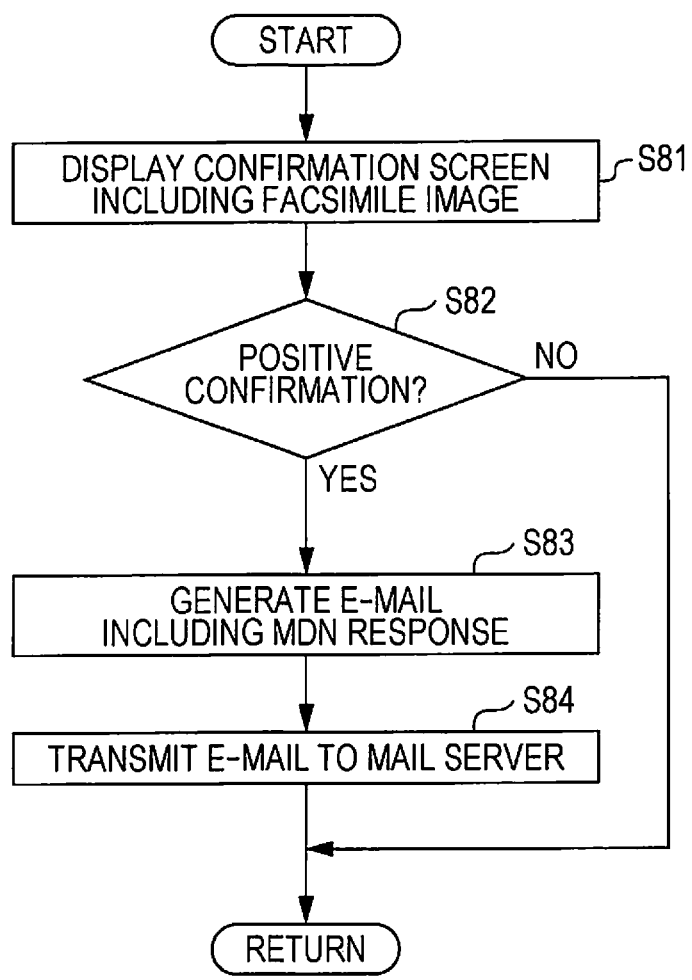
FIG. 10 is a flowchart illustrating a confirmation control process that is performed by a PC.
Figure 11:
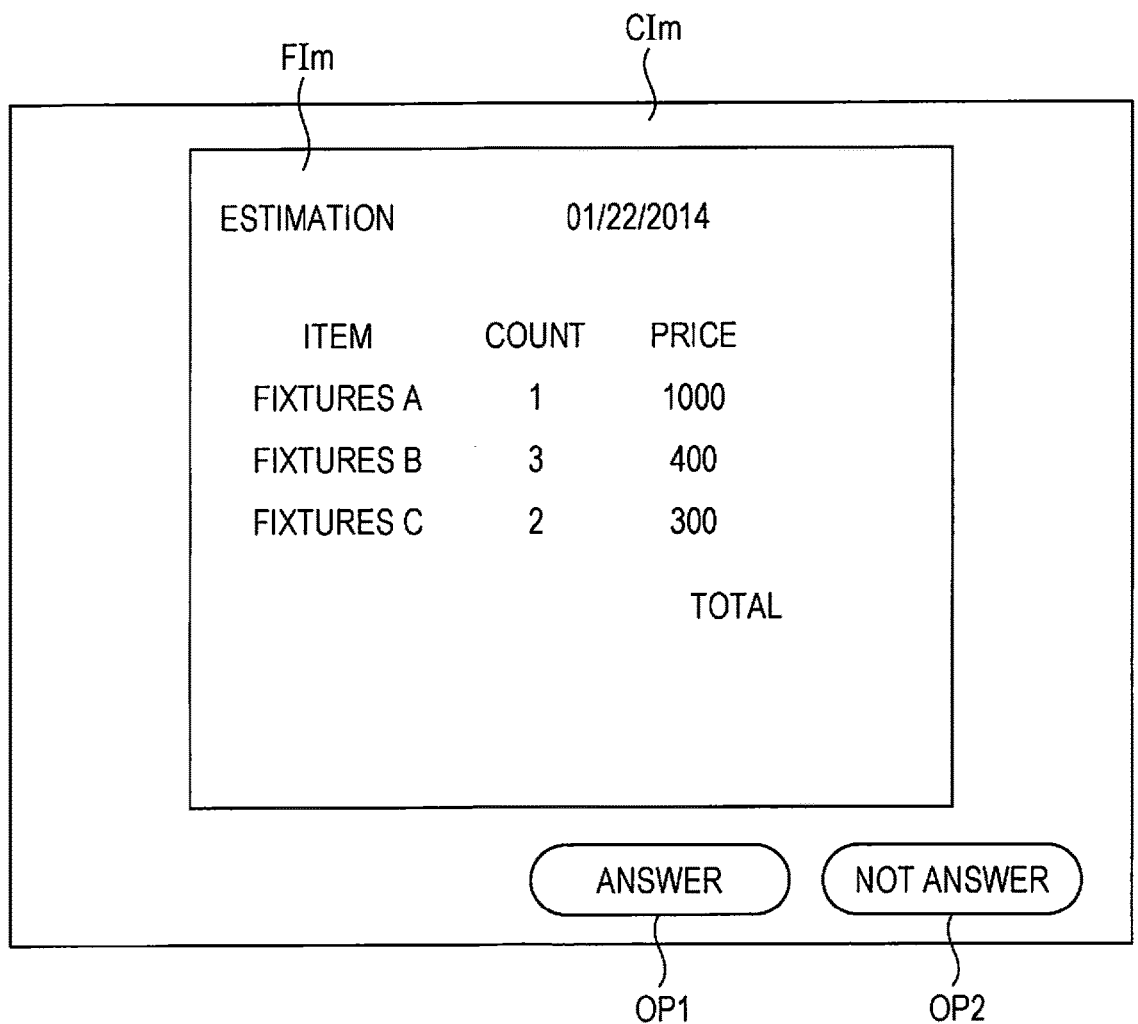
FIG. 11 is a diagram illustrating a confirmation screen that is displayed on a display during a confirmation process by the PC.

FIG. 10 is a flowchart illustrating a confirmation control process that is performed by the PC 30. FIG. 11 is a diagram illustrating a confirmation screen that is displayed on a display during a confirmation process by the PC 30.

In step S81 of FIG. 10, the confirmation control unit 401 of the PC 30 displays a confirmation screen CIm including a fax image FIm that is attached to the e-mail. Operation icons OP1 and OP2, that the user operates when performing the MDN response, are displayed on the confirmation screen CIm, in addition to the fax image FIm that is attached to the e-mail. The user confirms the confirmation screen CIm, and when the MDN response is positive, the user operates the operation icon OP1. Meanwhile, the user confirms the confirmation screen CIm, and when the MDN response is negative, the user operates the operation icon OP2.

When receiving a negative operation for the MDN response from the user (step S82: NO), the confirmation control unit 401 ends the process without performing the MDN response. In other words, neither the multifunction peripherals 10 nor the PC 30 performs the MDN response for the multifunction peripheral 60.

Meanwhile, when receiving an operation input to perform the MDN response for the fax image, from the user (step S82: YES), the confirmation control unit 401 creates an e-mail in which the result information of the MDN is attached to the header part, with the address of the MDN response contained in the header part of the e-mail transmitted from the multifunction peripheral 10 as the destination field, in step S83. Next, in step S84, the confirmation control unit 401 transmits the created e-mail from the network IF 32. In other words, the MDN response is performed by the PC 30.

If referring back to FIG. 8, the e-mail (MDN response) that has been transmitted to the mail server 50 is transferred to the mail server 70 (step S9). Through the inquiry about the e-mail by the multifunction peripheral 60, an e-mail containing the MDN response is delivered to the multifunction peripheral 60 (steps S10 and S11). As a result, the multifunction peripheral 60 confirms the MDN response contained in the e-mail that has been transmitted from the PC 30.

(4) Operation and Effect of the invention

As described above, the following operations and effects are achieved in the multifunction peripheral 10 according to the first embodiment, as described above. When acknowledgement response is not permitted by the determination unit 202, the response control unit 203 transfers the reception data to the PC 30. Therefore, since such reception data undergoes the confirmation process of the PC 30 by the user, the user can select whether or not to perform acknowledgement response for the request for an acknowledgement response.

Further, it is possible to determine automatically the transmission source apparatus to perform the MDN response using the destination information, thereby automatically sorting an e-mail requiring a confirmation by the user in the PC 30.

2. Second Embodiment

The configuration of the second embodiment is different from that of the first embodiment in that in the confirmation control process performed by the PC 30, even when there is a positive operation input by the user, the result of the confirmation process is returned to the multifunction peripheral 10, without performing the MDN response. In other words, only the multifunction peripheral 10 performs the MDN response, and the PC 30 does not perform the MDN response.

Figure 12:
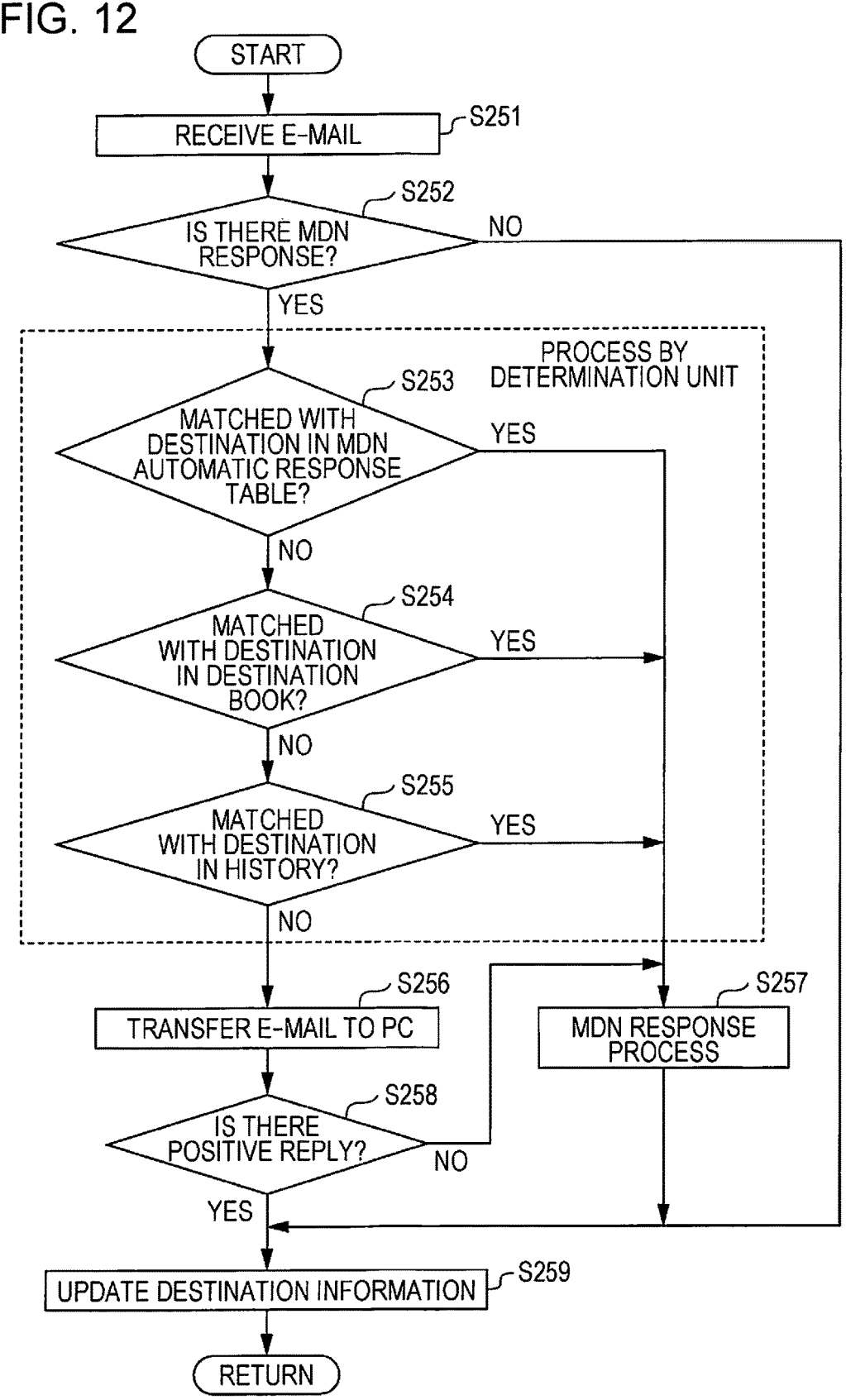
FIG. 12 is a flowchart illustrating a determination process and a response control process that are performed by a multifunction peripheral in a second embodiment.

FIG. 12 is a flowchart illustrating processes that are performed by the multifunction peripheral 10, in the second embodiment. For example, since the process illustrated in FIG. 12 is the process performed in step S5 of FIG. 8 illustrated in the first embodiment, a portion thereof will be described by diverting FIG. 8.

In step S5 of FIG. 8, the multifunction peripheral 10 performs a determination process and a response control process on the MDN response contained in the transmitted e-mail.

First, in step S251 of FIG. 12, an e-mail is received. In step S252, the main control unit 20 searches the presence or absence of a request for an MDN response, with reference to the header part of the e-mail. When the request for the MDN response is not included in the header part (step S252: NO), the main control unit 20 ends the process. When the request for the MDN response is included in the header part (step S252: YES), the main control unit 20 proceeds to step S253.

In step S253, the determination unit 202 compares the destination recorded in the MDN automatic response table 171 with the destination of the transmission source (here, multifunction peripheral 60) of the e-mail. If the destinations match each other (step S253: YES), the process proceeds to step S257, and the response control unit 203 performs the MDN response by the main control unit 20.

Meanwhile, if the destinations do not match each other (step S253: NO), the process proceeds to step S254, and the determination unit 202 compares the destination recorded in the destination book 172 with the destination of the transmission source apparatus. When the destinations match each other (step S254: YES), the process proceeds to step S257, and the response control unit 203 performs the MDN response by the main control unit 20.

If the destinations do not match each other (step S254: NO), the process proceeds to step S255, and the determination unit 202 compares the destination recorded in the history information 173 with the destination of the transmission source apparatus. When the destinations match each other (step S255: YES), the process proceeds to step S257, and the response control unit 203 performs the MDN response by the main control unit 20.

If the destinations do not match each other (step S255: NO), the response control unit 203 transfers an e-mail to the PC 30 in step S256. Proceeding to step S256 corresponds to that the determination unit 202 does not permit the MDN response by the main control unit 20. The response control unit 203 transfers the e-mail to the PC 30, and encourages the user to confirm the e-mail using the PC 30.

In step S8 of FIG. 8, if the PC 30 receives an e-mail destined for the PC 30 delivered from the mail server 50, the PC 30 performs the confirmation control process.

Figure 13:
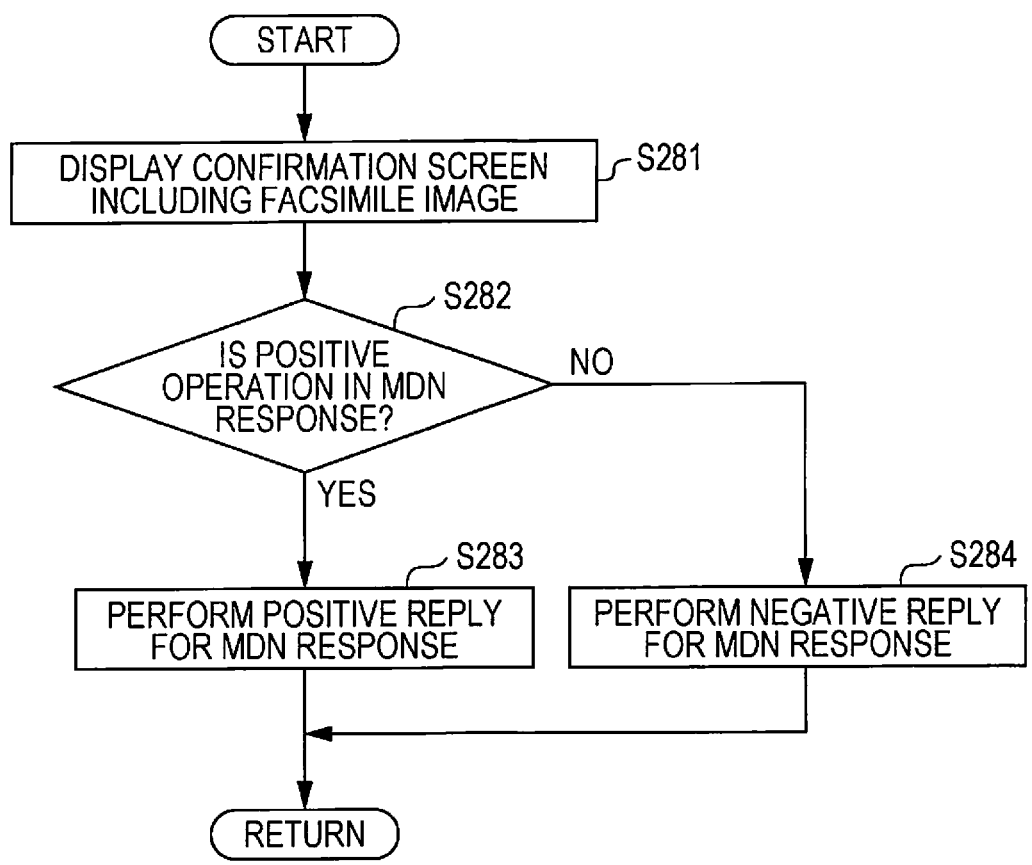
FIG. 13 is a flowchart illustrating a confirmation control process that is performed by a PC, in the second embodiment.

FIG. 13 is a flowchart illustrating a confirmation control process that is performed by the PC 30.

In step S281, the confirmation control unit 401 of the PC 30 displays the confirmation screen CIm containing the fax image FIm attached to the e-mail. Also in the second embodiment, for example, the confirmation screen CIm is displayed on the PC 30. The user confirms the confirmation screen CIm, and when the MDN response is positive, the user operates the operation icon OP1.

When receiving a positive operation input for the MDN response by the user (step S282: YES), the confirmation control unit 401 sends a positive reply for the MDN response to the multifunction peripheral 10, in step S283. For example, the reply from the PC 10 to the multifunction peripheral 30 is performed through an e-mail destined for the multifunction peripheral 30.

When receiving a positive operation input for the MDN response by the user (step S282: YES), the confirmation control unit 401 sends a negative reply for the MDN response to the multifunction peripheral 10, in step S284. For example, an e-mail destined for the multifunction peripheral 30 is transmitted from the PC 10.

If referring back to FIG. 12, the multifunction peripheral 10 determines the reply from the PC 30 in step S258. If the reply from the PC 30 is negative for the MDN response (step S258: NO), the process proceed to step S257, and the response control unit 203 performs the MDN response in the main control unit 20. Meanwhile, if the reply from the PC 30 is positive for the MDN response (step S258: YES), the response control unit 203 proceeds to step S259, without performing the MDN response.

In step S259, the destination information updating unit 204 updates the destination information, according to the determination of the reply from the PC 30 in step S258. Updating the destination information is intended to teach the determination unit 202, based on the result of the reception of the current e-mail.

Figure 14:
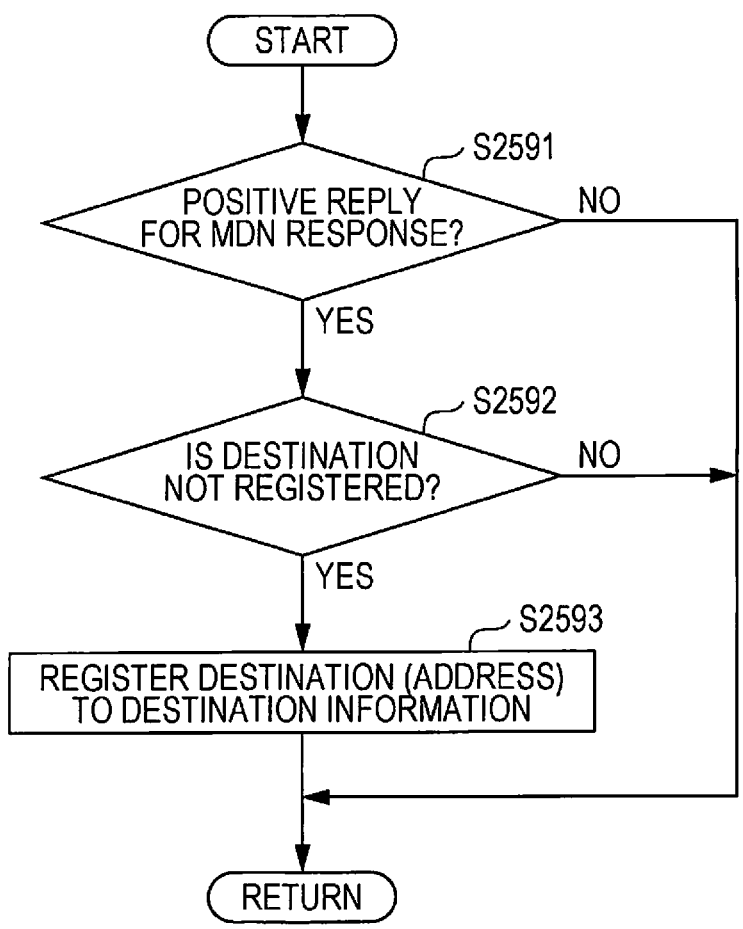
FIG. 14 is a flowchart illustrating an updating process that is performed by a destination information updating unit.

FIG. 14 is a flowchart illustrating an updating process that is performed by the destination information updating unit 204. The flowchart illustrated in FIG. 14 illustrates a case where the destination information updating unit 204 updates an address book as an example.

In step S2591, the destination information updating unit 204 determines whether or not the reply from the PC 30 is positive for the MDN response. If the reply from the PC 30 is positive for the MDN response (step S2591: YES), the process proceeds to step S2592. If the reply from the PC 30 is negative for the MDN response (step S2591: NO), the process is ended.

In step S2592, the destination information updating unit 204 determines whether or not the destination of the transmission source of the current e-mail is registered in the destination book 173. If the destination of the transmission source of the e-mail is not registered in the destination book 173 (step S2592: YES), in step S2593, the destination information updating unit 204 registers the destination in the destination book 174. Since the destination is registered in the destination book, hereinafter, even when receiving the e-mail containing a request for an MDN response from the transmission source of the same destination, since the MDN response is permitted by the main control unit 20, the determination unit 202 does not need to a confirmation by the PC 30.

Meanwhile, if the destination of the transmission source of the e-mail has been already registered in the destination book 173 (step S2592: NO), the destination information updating unit 204 ends the process.

As described above, in the second embodiment, the following effects are achieved in addition to the effects achieved in the first embodiment. In other words, it becomes possible to teach the determination by the determination unit 202 based on the confirmation result by the PC 30, whether to perform the MDN response in the multifunction peripheral 10 can be performed according to the user more.

3. Other Embodiments

The present invention includes various embodiments.

Using a multifunction peripheral as the communication apparatus is only an example, and the communication apparatus may be an apparatus which does not include the image scanner 13, such as a printer, a PC, and a portable terminal.

Realizing an external apparatus with the PC 30 is not only an example, and the external apparatus may be realized by a portable terminal with a function capable of communicating with a communication apparatus.

Using an e-mail for communication between the multifunction peripheral 10 and the PC 30 is not only an example, and communication may be performed through connection using a wired cable, or may be performed by using a short-range wireless communication.

Conditions on which the determination unit 202 determines the destination of the transmission source apparatus are not limited to those disclosed in the first embodiment or second embodiment. For example, the MDN automatic response table 171, the destination book 172, and the history information 173 are individually used, or may be combined.

In addition, the destination for which the MDN response is not forcibly permitted as well as the destination for which the MDN response is forcibly permitted may be registered in the MDN automatic response table 171.

Incidentally, it is needless to say that the invention is not limited to the above embodiments. It will be appreciated by those skilled in the art, the followings are intended to be disclosed as an embodiment of the invention:

applying the mutually substitutable members, the configurations, and the like which are disclosed in the above embodiments as appropriate by changing the combinations applying members, the configurations, and the like, which are not disclosed in the above mentioned examples, but are a well-known technique, and are mutually substitutable with the members, the configurations, and the like which are not disclosed in the above embodiments as appropriate by changing the combinations, and applying members, the configurations, and the like which are not disclosed in the above mentioned examples, but can be envisaged as substitutes for the members, the configurations, and the like which are not disclosed in the above embodiments as appropriate by substituting as appropriate or changing the combinations, by those skilled in the art, based on a well-known technique.

The entire disclosure of Japanese Patent Application No. 2015-018190, filed Feb. 2, 2015 is expressly incorporated by reference herein.

What is claimed is:

1. A communication apparatus comprising:
a first communication interface that communicates with a transmission source apparatus over a network;
a second communication interface that communicates with an external apparatus;
a memory that stores destination information of the transmission source apparatus; and
a processor including
a determination unit that determines whether or not to send an acknowledgement response from the communication apparatus to the transmission source apparatus, based on the destination information, when reception data contains a request for the acknowledgement response, and
a response control unit, in which when the acknowledgement response is permitted, the response control unit sends an acknowledgement to the transmission source apparatus by using the first communication interface, and when the acknowledgement response is not permitted, the response control unit transfers the reception data to the external apparatus by using the second communication interface so that the external apparatus outputs the transferred reception data to a user and sends the acknowledgement response to the transmission source apparatus in response to confirmation of the output reception data by the user.

2. The communication apparatus according to claim 1, wherein the external apparatus is configured to send the acknowledgement response to the transmission source apparatus.

3. The communication apparatus according to claim 1, wherein when a reply based on an output of the reception data by the external apparatus is received through the second communication interface, the response control unit sends an acknowledgement to the transmission source apparatus by using the first communication interface.

4. The communication apparatus according to claim 1, wherein destinations, for which an acknowledgement response is permitted or is not permitted, are stored in the destination information.

5. The communication apparatus according to claim 1, wherein the destination information contains a communication history performed through the first communication interface.

6. A communication apparatus comprising:
a first communication interface that communicates with a transmission source apparatus over a network;
a second communication interface that communicates with an external apparatus;
a memory that stores destination information of the transmission source apparatus; and
a processor including
    a determination unit that determines whether or not to send an acknowledgement response from the communication apparatus to the transmission source apparatus, based on the destination information, when reception data contains a request for the acknowledgement response, and
    a response control unit, in which when the acknowledgement response is permitted, the response control unit sends an acknowledgement to the transmission source apparatus by using the first communication interface, and when the acknowledgement response is not permitted, the response control unit transfers the reception data to the external apparatus by using the second communication interface,
wherein when a reply based on an output of the reception data by the external apparatus is received through the second communication interface, the response control unit sends an acknowledgement to the transmission source apparatus by using the first communication interface, and the processor includes a destination information updating unit that updates the destination information, in response to the reply from the external apparatus.

7. A communication method comprising:
determining whether or not to send an acknowledgement response using a first communication unit to a transmission source apparatus, based on destination information stored in a storage unit, when a request for acknowledgement from a transmission source apparatus is contained in reception data received through the first communication unit connected to a network; and
sending an acknowledgement to the transmission source apparatus by using the first communication unit, when the acknowledgement response is permitted in the determination, and transferring the reception data to an external apparatus by using a second communication unit so that the external apparatus outputs the transferred reception data to a user and sends the acknowledgement response to the transmission source apparatus in response to confirmation of the output reception data by the user, when the acknowledgement response is not permitted in the determination.

8. A communication system comprising a communication apparatus, and an external apparatus capable of outputting reception data,
wherein the communication apparatus includes
    a first communication interface that communicates with a transmission source apparatus over a network,
    a second communication interface that communicates with an external apparatus,
    a memory that stores destination information of the transmission source apparatus, and
    a processor including
        a determination unit that determines whether or not to send an acknowledgement response from the communication apparatus to the transmission source apparatus, based on the destination information, when reception data contains a request for the acknowledgement response, and
        a response control unit, in which when the acknowledgement response is permitted, the response control unit sends an acknowledgement to the transmission source apparatus by using the first communication interface, and when the acknowledgement response is not permitted, the response control unit transfers the reception data to the external apparatus by using the second communication interface and
wherein the external apparatus includes
    a processor including
        a confirmation control unit that outputs the transferred reception data, and sends the acknowledgement response to the transmission source apparatus by using a third communication interface, in response to confirmation of the output reception data by the user.

* * * * *